US012240266B2

(12) United States Patent
Oger

(10) Patent No.: US 12,240,266 B2
(45) Date of Patent: Mar. 4, 2025

(54) FRICTION BODY

(71) Applicant: Société BIC, Clichy (FR)

(72) Inventor: Myriam Oger, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/258,128

(22) PCT Filed: Dec. 17, 2021

(86) PCT No.: PCT/EP2021/086489

§ 371 (c)(1),
(2) Date: Jun. 16, 2023

(87) PCT Pub. No.: WO2022/129522

PCT Pub. Date: Jun. 23, 2022

(65) Prior Publication Data

US 2024/0066911 A1 Feb. 29, 2024

(30) Foreign Application Priority Data

Dec. 18, 2020 (EP) .................................... 20315499

(51) Int. Cl.
*B43K 29/00* (2006.01)
*B43K 29/02* (2006.01)
*B43L 19/00* (2006.01)

(52) U.S. Cl.
CPC .......... *B43L 19/0025* (2013.01); *B43K 29/02* (2013.01)

(58) Field of Classification Search
CPC ............................ B43K 29/02; B43L 19/0025
USPC .......................................................... 401/195
See application file for complete search history.

(56) References Cited

U.S. PATENT DOCUMENTS

| | | | |
|---|---|---|---|
| 8,282,299 | B2 | 10/2012 | Ito et al. |
| 9,592,702 | B2 | 3/2017 | Wase et al. |

FOREIGN PATENT DOCUMENTS

| | | | | |
|---|---|---|---|---|
| CN | 105153578 A | 12/2015 | | |
| EP | 1939259 A2 | 7/2008 | | |
| EP | 3702419 A1 | 9/2020 | | |
| JP | 3450053 B2 | 9/2003 | | |
| WO | 2005003216 A1 | 1/2005 | | |
| WO | 2010035836 A1 | 4/2010 | | |
| WO | WO-2022129522 A1 * | 6/2022 | ............ | B43K 29/02 |

OTHER PUBLICATIONS

International Search Report and Written Opinion issued in International Application No. PCT/EP2021/086489, mailed on Jun. 23, 2022.

* cited by examiner

*Primary Examiner* — Jennifer C Chiang
(74) *Attorney, Agent, or Firm* — Bookoff McAndrews, PLLC

(57) ABSTRACT

A friction body for discoloring handwriting written with a thermochromic ink with frictional heat, the friction body including a surface portion configured to generate frictional heat when manually rubbed on a porous substrate. The surface portion may have a thermal effusivity of less than about 300 J $K^{-1}$ $m^{-2}$ $s^{-1/2}$.

19 Claims, No Drawings

FRICTION BODY

CROSS REFERENCE TO RELATED APPLICATIONS

This is a National Stage Application under 35 U.S.C. § 371 of International Application No. PCT/EP2021/086489, filed Dec. 17, 2021, now published as WO 2022/129522 A1, which claims priority to European Patent application No. 20315499.2, filed on Dec. 18, 2020, its content being incorporated herein by reference.

TECHNICAL FIELD

The present disclosure relates to erasers for specifically erasing writing made with thermochromic ink and to writing instruments comprising such erasers.

BACKGROUND OF THE DISCLOSURE

In recent years, writing instruments dispensing thermochromic inks have found widespread acceptance by the consumer. Thermochromic inks are inks which change or fade in color when heated above a certain temperature threshold. In a typical application, the user can erase a thermochromic handwriting by rubbing a friction body against the paper. The frictional heat generated by the friction body heats the thermochromic handwriting above the ink's discoloration temperature and erases the handwriting.

Many materials have been suggested for friction bodies, including elastomers which are also used for erasers for conventional pencils. However, the relatively high discoloration temperatures may require stronger rubbing action which, in turn, can erode, wrinkle or otherwise damage the paper. This is highly undesirable since it impedes or changes the appearance of a re-writing on rubbed areas. Thus, for a well-working friction body, it is necessary to balance the amount of generated frictional heat necessary for erasing the thermochromic ink against paper damage caused by the rubbing action. Further design considerations are the rubbing time required for heating up the paper and the user comfort when rubbing the thermochromic writing. Ideally, the user should perceive a feeling of precision when rubbing (e.g. the friction body should not be too soft to give a feeling of an uncontrolled rubbing action), but also not a feeling of excessive stiffness which gives the friction body an uncomfortable feel when rubbing. In addition, typical eraser materials are consumed and, thus, the friction body has a limited service life. This is in particular problematic for refillable writing instruments which have a much longer service life than single-use pens. A more durable material would also be desirable.

The prior art has attempted to address some of the aforementioned aspects, in particular the issue of generating sufficient frictional heat necessary for erasing the thermochromic ink without unduly damaging the paper substrate. U.S. Pat. No. 9,592,702 B2 suggests a number of potentially suitable friction body materials and teaches that, in addition to suitably adjusting the frictional properties, the thermal conductivity of the friction body should be adjusted to the range of 0.05 to 50 W/(m·K). It is suggested that thermal conductivities in excess of 50 W/(m·K) make it difficult for elderly persons and children to reliably erase the handwriting and that thermal conductivities of less than 0.05 W/(m·K) causes paper damage due to excessive heat. The thermal conductivity in the sense of U.S. Pat. No. 9,592,702

B2 is the thermal conductivity measured at a pressure loading of 250 kg/m$^2$, a high temperature plate of 35° C., and a low temperature plate of 5° C., by use of AUTOA (HC-072) manufactured by Eko Instruments Co. Ltd. However, a diligent investigation of the present inventors has found that the thermal conductivity as measured in U.S. Pat. No. 9,592,702 B2 is not a reliable means for determining suitable friction body materials. Frustratingly, materials having a thermal conductivity in the range of 0.05 to 50 W/(m·K) may or may not work well for heretofore unknown reasons.

The present disclosure aims at improving some or all of the aforementioned issues in the prior art.

SUMMARY OF THE PRESENT DISCLOSURE

In a first aspect, the present disclosure relates to a friction body for discoloring handwriting written with a thermochromic ink with frictional heat. The friction body may comprise a surface portion configured to generate frictional heat when manually rubbed on a porous substrate. The porous substrate may in particular be a paper substrate. The surface portion may have a thermal effusivity of less than about 300 J K$^{-1}$ m$^{-2}$ s$^{-1/2}$, specifically less than about 250 J K$^{-1}$ m$^{-2}$ s$^{-1/2}$, and in particular less than about 170 J K$^{-1}$ m$^{-2}$ s$^{-1/2}$.

In some embodiments, the surface portion may be configured to heat to a surface temperature of between about 40° C. to about 80° C. when pressed onto a 45 g/m$^2$ paper made of 100% chemical pulp and having a brightness of about 83% with a load of about 500 g per about 3 mm$^2$ to about 8 mm$^2$, in particular about 4 mm$^2$ to about 5 mm$^2$, contact area and pulled across the paper with a constant pull rate of about 50 to about 500 mm/s, more specifically of about 50 to about 200 mm/s.

In some embodiments, the friction body may comprise a macromolecular matrix having a first thermal conductivity and domains arranged within said macromolecular matrix having a second thermal conductivity which is lower than the first thermal conductivity.

In some embodiments, the friction body may comprise a macromolecular matrix and gas-filled pores, in particular closed-cell pores.

In some embodiments, the macromolecular matrix may be plant-based. In some embodiments, the friction body may comprise suberin and/or lignin, more specifically the friction body may be a suberin-constituent material, in particular a bark cork.

In some embodiments, the friction body may comprise a plant-based material having a density of less than about 0.40 g/cm$^{-3}$, more specifically less than less than about 0.35 g/cm$^{-3}$, and in particular less than less than about 0.30 g/cm$^{-3}$.

In some embodiments, the friction body may comprise a bark material, in particular natural cork, or a lignin-containing material, in particular wood. In some embodiments, it may be particularly advantageous that the friction body may comprise suberin and/or lignin, more specifically the friction body may be a suberin-constituent material, in particular a bark cork.

In a second aspect, the present disclosure relates to a friction body for discoloring handwriting written with a thermochromic ink with frictional heat. The friction body may comprise a surface portion comprising bark material, in particular natural cork.

In some embodiments, both according to the first and second aspect of the present disclosure, the surface portion may have a kinetic coefficient of friction of between about 0.20 and about 0.90, more specifically between about 0.30 to about 0.80, and in particular between about 0.40 and about 0.70, when a specimen of the friction body comprising at least a part of said surface portion is pressed onto a 45 $g/m^2$ paper made of 100% chemical pulp and having a brightness of about 83% with a load of about 500 g per about 3 $mm^2$ to about 8 $mm^2$, in particular about 4 $mm^2$ to about 5 $mm^2$, contact area contact area and pulled across the paper with a constant pull rate of about 1.6 mm/s (i.e. 96 mm/min).

In some embodiments, both according to the first and second aspect of the present disclosure, at least the surface portion of the friction body may have a Shore A hardness of between about 50 to about 90, more specifically between about 55 to about 85, and in particular between about 60 and about 80.

In some embodiments, both according to the first and second aspect of the present disclosure, at least the surface portion of the friction body has a thermal conductivity of less than 0.05 W/(m·K).

In some embodiments, both according to the first and second aspect of the present disclosure, the friction body may have a Young's modulus of less than about less than about 35 MPa, more specifically between about 10 and about 35 MPa, in particular between about 15 and about 30 MPa.

In some embodiments, both according to the first and second aspect of the present disclosure, the friction body may have a specific heat capacity of at least about 1300 $J \cdot kg^{-1} \cdot K^{-1}$, more specifically between about 1300 to about 3000 $J \cdot kg^{-1} \cdot K^{-1}$. more specifically between about 1400 to about 2500 $J \cdot kg^{-1} \cdot K^{-1}$.

According to a third aspect of the present disclosure, there is provided a writing instrument comprising a friction body. The writing instrument may comprise a writing tip and a storage compartment. The storage compartment may comprise a thermochromic ink. The storage compartment may be in fluid communication with the writing tip. The friction body may be according to any of the aforementioned first and second aspect of the present disclosure.

In some embodiments, the thermochromic ink is configured to change its color or discolor when heated to a temperature of between about 40° C. to about 80° C., specifically between about 45° C. and about 70°, and in particular between about 50° C. and about 65° C.

In some embodiments, the friction body may be positioned at the end opposite to the writing tip. In some embodiments, the writing instrument may comprise a cap for capping the writing tip which comprises the friction body.

DETAILED DESCRIPTION OF THE PRESENT DISCLOSURE

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

The present inventors have surprisingly found that, instead of the thermal conductivity as measured in U.S. Pat. No. 9,592,702 B2, the thermal effusivity is a more reliable parameter to identify and determine the performance of a friction body material. The thermal conductivity referred to in U.S. Pat. No. 9,592,702 B2 is measured by measuring heat conducting between a high temperature plate and a low temperature plate, i.e. is measuring a thermodynamic and bulk-related parameter. However, the present inventors have found that basing material selection on a bulk property such as thermal conductivity is a flawed concept in that a thermodynamic bulk-related parameter is not adequately representing the rubbing action and the associated temperature increase of the rubbed surface. Erasing a thermochromic handwriting is a process of a matter of seconds and, thus, it is believed that the kinetic aspect of heat conductance plays an important role in determining the overall performance of the friction body material. The thermal effusivity (sometimes also called the heat penetration coefficient) is a measure of how fast heat can penetrate from the surface into the bulk of the friction material. Moreover, also in context of thermal effusivity, frictional heat generated at the interface of the friction body and the paper surface is considered to be subject to i.a. two competing processes: It can either dissipate into the paper substrate or into the bulk of the friction body. Thus, a thermal effusivity of the friction body which is relatively low in comparison to the thermal effusivity of the paper substrate is considered to optimally ensure that heat is preferentially accumulating in the paper substrate to discolor the thermochromic writing during the rubbing action.

Accordingly, in a first aspect, the present disclosure relates to a friction body for discoloring handwriting written with a thermochromic ink with frictional heat. The friction body may comprise a surface portion configured to generate frictional heat when manually rubbed on a porous substrate. The porous substrate may in particular be a paper substrate. The surface portion may have a thermal effusivity of less than about 300 J $K^{-1}$ $m^{-2}$ $s^{-1/2}$.

As stated above, it is believed that a thermal effusivity of the surface portion of the friction body which is relatively low in comparison to the thermal effusivity of the porous paper substrate of commonly used densities optimally ensures that heat is preferentially accumulating in the porous substrate to discolor the thermochromic writing during the rubbing action. The relevant substrates, in particular paper substrates, commonly have a thermal effusivity exceeding about 300 J $K^{-1}$ $m^{-2}$ $s^{-1/2}$, often exceeding about 250 J $K^{-1}$ $m^{-2}$ $s^{-1/2}$, and almost always exceeding about 170 J $K^{-1}$ $m^{-2}$ $s^{-1/2}$. Accordingly, a surface of the friction body having a thermal effusivity of less than about 300 J $K^{-1}$ $m^{-2}$ $s^{-1/2}$, specifically less than about 250 J $K^{-1}$ $m^{-2}$ $s^{-1/2}$, and in particular less than about 170 J $K^{-1}$ $m^{-2}$ $s^{-1/2}$ will facilitate that the friction heat, or at least a substantial portion thereof, will penetrate into the porous substrate rather the bulk of the friction material. Typically, the porous substrate such as paper substrate has a paper weight comprised between about 25 to about 350 $g/m^2$, more specifically between about 30 to about 200 $g/m^2$.

The above relationship may explain why many materials which are seemingly suitable according to U.S. Pat. No. 9,592,702 B2 performed very poorly in our erasing tests: For instance, we tested hard PVC with a thermal conductivity ($\lambda$) of 0.19 W/mK and found it to have a very poor erasing performance. This may be explained by the fact that its thermal effusivity (e) was about 516 J $K^{-1}$ $m^{-2}$ $s^{-1/2}$, i.e. substantially above the above-identified threshold of paper (about 300 J $K^{-1}$ $m^{-2}$ $s^{-1/2}$.).

The thermal effusivity (e) is a well-established parameter and can be derived from the thermal conductivity (λ), the specific heat capacity (cp), and the density (ρ) according to the following formula (I):

$$e=[\lambda c_p \rho]^{1/2} \tag{I}$$

It is evident from the above formula that thermal effusivity (e) is not an inherent property to a specific type of material. For instance, wood as a type of material comes in many different varieties having different densities and thermal properties. However, the aforementioned parameters thermal conductivity, specific heat capacity, and density are well-catalogued parameters. Thus, it is simple on basis of formula (I) to identify further concrete materials which are suitable as candidates for erasing tests. Following the above guidance, the present inventors have, for instance, identified natural bark materials, in particular cork, as eraser materials for thermochromic inks. The above formula (I) also indicates that materials with lower density and/or lower specific heat capacity are of interest. This has directed the present inventors to foam materials which also performed well in eraser testings. The use of cork and foam materials is exemplified below in the experimental section.

In some embodiments, it may be advantageous that the surface portion has a thermal effusivity in the range of about 50 J $K^{-1}$ $m^{-2}$ $s^{-1/2}$ to about 300 J $K^{-1}$ $m^{-2}$ $s^{-1/2}$, more specifically from about 50 J $K^{-1}$ $m^{-2}$ $s^{-1/2}$ to about 250 J $K^{-1}$ $m^{-2}$ $s^{-1/2}$, and in particular from about 50 J $K^{-1}$ $m^{-2}$ $s^{-1/2}$ to about 170 J $K^{-1}$ $m^{-2}$ $s^{-1/2}$.

In some embodiments, the friction body may be composed of a single material, i.e. the core underneath the friction body's surface portion may be made of the same material as the surface portion itself. Alternatively, the surface portion may be made of a different material than the core material, for instance to modulate the stiffness and compression behavior of the friction body. Additionally or alternatively, the friction body may comprise two or more surface portions composed of different materials, for instance a surface portion for more aggressive rubbing action (e.g. having a higher coefficient of friction) and a surface portion for less aggressive rubbing action (e.g. having a lower coefficient of friction).

In some embodiments, the surface portion may be configured to heat to a surface temperature of between about 40° C. to about 80° C. during the rubbing action. In this context, the term "surface temperature" is intended to mean the temperature at the interface between the surface portion of the friction body and the surface of the porous substrate. As such, determining the surface temperature is not particularly limited and can be measured on either the surface portion of the friction body or the surface portion of the porous substrate. A surface temperature of below about 40° C. may be too low to reliably discolor the thermochromic ink whereas a surface temperature of above about 80° C. may damage the paper and/or feel uncomfortable to the user. Configuring the surface portion to heat to the aforementioned may be achieved by adjusting the surface roughness of the surface portion and/or by selecting materials having inherently high friction (such as poly urethane derivatives). Suitable materials can also be identified by pressing a sample onto standardized paper and measuring the generated surface heat when moving the sample under load under standardized conditions. Accordingly, in some embodiments, particularly advantageous materials provide a surface portion which is configured to heat to a surface temperature of between about 40° C. to about 80° C., specifically between about 45° C. and about 70°, and in particular between about 50° C. and about 70° C., when rubbed onto a 45 g/$m^2$ paper made of 100% chemical pulp and having a brightness of about 83% with a load of about 500 g per about 3 $mm^2$ to about 8 $mm^2$, in particular about 4 $mm^2$ to about 5 $mm^2$, contact area and pulled across the paper with a constant pull rate of about 50 to about 500 mm/s, more specifically of about 50 to about 200 mm/s, even more specifically between about 70 and about 150 mm/s, and in particular between about 80 and about 120 mm/s. The aforementioned load, contact areas and pull rates were found by the applicant to ideally represent the range of rubbing actions of typical users and, thus, allows to effectively and effortlessly determine materials having both the required thermal effusivity and a suitable generation of frictional heat. In some embodiments, it may be advantageous that the surface temperature refers to the temperature measured on the surface of the porous substrate.

As said, following the teachings of the present disclosure, the applicant was able to identify new materials which are surprisingly highly suitable as friction body for thermochromic inks. One such material is cork, a material which—according to the aforementioned U.S. Pat. No. 9,592,702 B2—would be unsuitable as friction body material since its thermal conductivity is outside of the range of 0.05 to 50 W/(m·K). Cork is a plant-based compression-resistant and resilient material having a closed-cell structure in which the cells are filled with gasses. Without wishing to be bound by theory, it is believed that the excellent performance of cork can be attributed to the low thermal effusivity of cork which may be due to the high content of gas-filled cells which provide insulative properties to the cork.

Accordingly, in some embodiments, the friction body or the surface portion of the friction body may comprise a macromolecular matrix having a first thermal conductivity and domains arranged within said macromolecular matrix having a second thermal conductivity which is lower than the first thermal conductivity. According to one embodiment, such a friction body is cork. The plant-based material forms a macromolecular matrix having a first (higher) thermal conductivity and the gas-filled cells (or void spaces or pores) form the domains arranged within the macromolecular matrix having a second (lower) thermal conductivity. However, the present disclosure also relates to other materials, for instance various polymer-based foams.

In some embodiments, the friction body may comprise a macromolecular matrix and gas-filled pores, in particular closed-cell pores. In some embodiments, it may be advantageous that the friction body comprises a macromolecular matrix and gas-filled pores, in particular closed-cell pores, and has a density of less than about 0.40 g/$cm^{-3}$, more specifically less than less than about 0.35 g/$cm^{-3}$, and in particular less than less than about 0.30 g/$cm^{-3}$. In some embodiments, the macromolecular matrix may be plant-based. As said, in some embodiments, it may be advantageous that the friction body comprises closed-cell pores. This may additionally help in reducing staining of the friction body since the ink, residues from the paper and dirt cannot penetrate as well into the bulk of the body.

In some embodiments, the friction body may comprise a plant-based material, in particular cork or wood. The term "plant-based", as used here-before and elsewhere throughout the specification, is not particularly limited and in particular includes materials from plant origin, materials obtained by processing plants, and materials of fungal origin.

In some embodiments, the friction body may comprise lignin-containing material, in particular cork or wood.

In some embodiments, the friction body may comprise suberin and/or lignin, more specifically the friction body may be a suberin-constituent material, in particular a bark cork. In some embodiments, it may be advantageous that the friction body comprises suberin in an amount of more than about 20 wt.-%, in particular more than about 30 wt.-%, and in particular more than about 40 wt.-%, relative to the total weight of the friction body. Suberin is a complex, higher plant epidermis and periderm cell-wall macromolecule, forming a protective barrier in the bark. Chemically, suberin is a complex polyester biopolymer, lipophilic, and composed of long chain fatty acids called suberin acids, and glycerol. Due to its chemical nature, it is a somewhat rubbery material and can impart rubber-like elasticity in the plant-based material. As such, it may favorably contribute to the softness and feel of the rubbing action.

In some embodiments, the friction body may comprise a plant-based material having a density of less than about 0.40 $g/cm^{-3}$, more specifically less than less than about 0.35 $g/cm^{-3}$, and in particular less than less than about 0.30 $g/cm^{-3}$. In some embodiments, the plant-based material may comprise lignin, in particular an amount of lignin which is larger than about 20 wt.-%, more specifically larger than about 25 wt.-%, relative to the total weight of the plant-based material. In some embodiments, it may be particularly advantageous that the plant-based material additionally comprises suberin in an amount of more than about 20 wt.-%, in particular more than about 30 wt.-%, and in particular more than about 40 wt.-%, relative to the total weight of the friction body.

In some embodiments, the friction body may comprise a bark material, in particular natural cork. These materials are more environmentally friendly than friction bodies made of synthetic materials. Moreover, it was surprisingly found these materials may have a hardness, elasticity compression resistance and rebound after compression which provides the user with an excellent feel during the rubbing action. Also surprisingly, it was found that, in addition to the generation of good frictional heat, these materials have a very low material loss during the rubbing action.

Accordingly, in a second aspect, the present disclosure relates to a friction body for discoloring handwriting written with a thermochromic ink with frictional heat, wherein the friction body comprises a surface portion comprising bark material. In some embodiments, it may be advantageous that the bark material is cork. In some embodiments, the cork may be composed of cork granules which are compounded with a resin. However, in some embodiments, it may be advantageous that the cork is not compounded with a resin, and more specifically it may be advantageous that the cork is natural cork.

In some embodiments, both according to the first and second aspect of the present disclosure, the friction body may comprise a surface portion has a kinetic coefficient of friction of between about 0.20 and about 0.90, more specifically between about 0.30 to about 0.80, and in particular between about 0.40 and about 0.70. The friction coefficient may be determined using a standardized paper, e.g. when a specimen of the friction body comprising at least a part of said surface portion is pressed onto a 45 $g/m^2$ paper made of 100% chemical pulp and having a brightness of about 83% with a load of about 500 g per about 3 $mm^2$ to about 8 $mm^2$, in particular about 4 $mm^2$ to about 5 $mm^2$, contact area contact area and pulled across the paper with a constant pull rate of about 1.6 mm/s (e.g. 96 mm/min).

In some embodiments, both according to the first and second aspect of the present disclosure, the friction body at least the surface portion of the friction body has a Shore A hardness of between about 50 to about 90, more specifically between about 55 to about 85, and in particular between about 60 and about 80. The determination of the Shore A hardness is not particularly limited and may be performed with a durometer e.g. according to ISO 868.

In some embodiments, both according to the first and second aspect of the present disclosure, the friction body may have a thermal conductivity of less than 0.05 W/(m·K), in particular if measured as disclosed in U.S. Pat. No. 9,592,702 B2, the disclosure of the measuring method being incorporated herein by reference.

In some embodiments, both according to the first and second aspect of the present disclosure, the friction body may have a Young's modulus of less than about 35 MPa, more specifically between about 10 and about 35 MPa, in particular between about 15 and about 30 MPa. The determination of the Young's modulus is not particularly limited and may be performed on a test piece prepared by punching an eraser in a dumbbell shape with a distance between marked lines of 30 mm e.g. according to a method conforming to JIS K6251.

In some embodiments, both according to the first and second aspect of the present disclosure, the friction body may have a specific heat capacity of at least about 1300 $J \cdot kg^{-1} \cdot K^{-1}$, more specifically between about 1300 to about 3000 $J \cdot kg^{-1} \cdot K^{-1}$, and in particular between about 1400 to about 2500 $J \cdot kg^{-1} \cdot K^{-1}$. The determination of the heat capacity is not particularly limited and may be performed by AC-calorimetry which is a method of measuring the heat capacity in which an oscillatory heat flux is applied to a sample and its heat capacity is determined from the resultant temperature oscillations. In particular, it may be advantageous to use a material having a heat capacity value which is sufficiently low to allow a facilitate temperature increase and sufficiently high to enable it to keep thermal energy. This heat capacity property combined with the aforementioned thermal effusivity may be advantageous in the context of frictional heat generated as the interface of the friction body and the paper surface.

In some embodiments, both according to the first and second aspect of the present disclosure, it may be particularly advantageous that the friction body comprises a surface portion having a kinetic coefficient of friction of between about 0.20 and about 0.90, more specifically between about 0.30 to about 0.80, and in particular between about 0.40 and about 0.70; and a Shore A hardness of between about 50 to about 90, more specifically between about 55 to about 85, and in particular between about 60 and about 80. The friction coefficient may be determined using a standardized paper, e.g. when a specimen of the friction body comprising at least a part of said surface portion is pressed onto a 45 $g/m^2$ paper made of 100% chemical pulp and having a brightness of about 83% with a load of about 500 g per about 3 $mm^2$ to about 8 $mm^2$, in particular about 4 $mm^2$ to about 5 $mm^2$, contact area contact area and pulled across the paper with a constant pull rate of about 1.6 mm/s (e.g. 96 mm/min). The parameters may be determined as defined above.

The aforementioned properties may contribute to providing the user with an excellent feel during the rubbing action. To further optimize feel during rubbing, it may be advantageous to provide friction body having the properties mentioned in the above paragraph and, in addition, a Shore A hardness of between about 50 to about 70, more specifically between about 55 to about 70.

According to a third aspect of the present disclosure, there is provided a writing instrument comprising a friction body.

The writing instrument may comprise a writing tip and a storage compartment. The storage compartment may comprise a thermochromic ink. The storage compartment may be in fluid communication with the writing tip. The friction body may be according to any of the aforementioned first and second aspect of the present disclosure.

In some embodiments, the thermochromic ink is configured to change its color or discolor when heated to a temperature of between about 40° C. to about 80° C., specifically between about 45° C. and about 70°, and in particular between about 50° C. and about 65° C.

In some embodiments, the friction body may be positioned at the end opposite to the writing tip. In some embodiments, the writing instrument may comprise a cap for capping the writing tip which comprises the friction body.

In some embodiments, the writing instrument may comprise a friction body which is affixed by e.g. an interference fit or an adhesive or by overmolding to a part of the writing instrument which is configured for receiving the friction body. The part of the writing instrument which is configured for receiving the friction body may be an enclosure such a ring or circumferentially arranged pins located at an end of the writing instrument, in particular the end of the writing instrument opposite to the writing tip. The part of the writing instrument which is configured for receiving the friction body may (additionally or alternatively to the aforementioned enclosure) comprise a protrusion which is extending into a cavity of the friction body. IN both instances, the part of the writing instrument which is configured for receiving the friction body may stabilize the friction body during the rubbing action and, thus, improve the user experience during rubbing by providing a firmer (e.g. less wobbly) erasing feeling. In some embodiments, it may be particularly advantageous that between about 30 to about 90 vol.-% of the friction body is located within the part of the writing instrument which is configured for receiving the friction body. In this context, it may also be advantageous that the friction body has a Shore A hardness of between about 50 to about 90, more specifically between about 55 to about 85, and in particular between about 60 and about 80. The combination of these features may be particularly beneficial in balancing erasing performance and feel. It may also be advantageous that the friction body has a Young's modulus of less than about 35 MPa, more specifically between about 10 and about 35 MPa, in particular between about 15 and about 30 MPa.

In some embodiments, the friction body may further comprise an abrading portion which is formed as a convex surface. The radius R of the curvature of the convex surface may be between about 1 mm to about 10 mm; more specifically between about 1.2 mm and about 8 mm, and in particular between about 1.5 mm and about 6 mm. In some embodiments, the abrading portion which is formed as a convex surface may comprise a rounded edge of the friction body. In these instances, the radius R of the curvature of the convex surface may be between about 1 mm to about 5 mm; more specifically between about 1.2 mm and about 4 mm, and in particular between about 1.5 mm and about 3 mm. In some embodiments, the abrading portion which is formed as a convex surface may comprise a semi-spheroidal or a semi-elipsoidal body. In these instances, the radius R of the curvature of the convex surface may be between about 1.5 mm to about 10 mm; more specifically between about 2 mm and about 8 mm, and in particular between about 3 mm and about 6 mm. Such convex shapes may be particularly beneficial to provide a good erasing performance and may allow the user to hold the writing instrument in variable positions during erasing without undue compromise on erasing performance. This may be particularly beneficial for the softer materials described in the preceding paragraph, in particular for friction bodies having a Shore A hardness of between about 50 to about 90, more specifically between about 55 to about 85, and in particular between about 60 and about 80. Such convex shapes may also reduce premature wear of the friction body avoiding sharp exposed edges.

Examples 1 to 3

Two different bark natural cork samples (Examples 1 and 2) have been tested to discolor the written mark made with thermochromic ink (from a Gelocity Illusion® pen) on a paper (Calligraphe Ligne 7000, 70 g/m$^2$ by Clairefontaine) by rubbing heat with the two different bark natural cork samples.

The kinetic friction coefficient has been measured according to the following method:

The bark natural cork samples are pressed onto a 45 g/m$^2$ paper made of 100% chemical pulp and having a brightness of about 83% with a load of about 500 g per to 4 mm$^2$ to 5 mm$^2$, contact area and pulled across the paper with a constant pull rate of 1.6 mm/s.

TriboLab Parameters:
Load: 500 g
Angle: 900
Pattern: Linear 5 forwards of 20 mm and 5 backs of 20 mm
Paper Supplier: Nippon Paper Industries Co. Ltd
Weight: 45 g/m2
Material: 100% Chemical pulp paper
Whiteness: 83%

TABLE 1

| Reference | Average COF 1.60 mm/s | 1.60 mm/s Forward COF | 1.60 mm/s Return COF | Hardness (Shore A) with a durometer according to ISO 868 | Surface contact area (mm$^2$) |
|---|---|---|---|---|---|
| Bark natural cork sample of example 1 | 0.500 | 0.502 | 0.497 | 60-67 | 4-5 |
| Bark natural cork sample of example 2 | 0.792 | 0.740 | 0.843 | 72-77 | 4-5 |

It has been evaluated that these materials performed well to discolor the thermochromic written mark made on a paper surface (reference papier) by frictional generated heat. In particular, the pressure to be applied was not too high and the sensation for the user was comfortable (smoothness feeling).

Besides, the materials exhibited good wear and there was no uncomfortable noise during the rubbing action. The material was also not stained by the ink (residues).

The sensation for the user while erasing the written mark with two cork materials is even smoother with the natural cork of example 1 than with the natural cork of example 2. This may be attributed to the softer nature of the material, as reflected by the lower Shore A value.

In a further experiment (Example 3), Airex T10, a PET foam from Airex AG Switzerland, and Bark natural cork sample of example 1 was used to manually erase thermochromic writing on a printing A4 paper, 80 gm/$m^2$ density. Both materials erased the hand writing, with the cork sample providing a better erasing performance and a smoother erasing feel.

Although specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A friction body for discoloring handwriting written with a thermochromic ink with frictional heat, wherein the friction body comprises a surface portion configured to generate frictional heat when manually rubbed on a porous substrate, and wherein the surface portion has a thermal effusivity of less than about 300 J $K^{-1}$ $m^{-2}$ $s^{-1/2}$.

2. The friction body of claim 1, wherein the porous substrate is a paper substrate.

3. The friction body of claim 1, wherein the thermal effusivity is less than about 250 J K−1 m−2 s−½.

4. The friction body of claim 1, wherein the surface portion is configured to heat to a surface temperature of between about 40° C. to about 80° C. when pressed onto a 45 g/m2 paper made of 100% chemical pulp and having a brightness of about 83% with a load of about 500 g per about 3 mm2 to about 8 mm2 contact area and pulled across the paper with a constant pull rate of about 50 to about 500 mm/s.

5. The friction body of claim 1, wherein the friction body comprises a macromolecular matrix having a first thermal conductivity and domains arranged within said macromolecular matrix having a second thermal conductivity which is lower than the first thermal conductivity.

6. The friction body of claim 1, wherein the friction body comprises a macromolecular matrix and gas-filled pores.

7. The friction body of claim 5, wherein the macromolecular matrix is plant-based.

8. The friction body of claim 1, wherein the friction body comprises a plant-based material having a density of less than about 0.40 g/cm−3.

9. The friction body of claim 1, wherein the friction body comprises a bark material.

10. The friction body of claim 9, wherein the friction body comprises natural cork.

11. The friction body of claim 9, wherein the friction body comprises a lignin-containing material.

12. The friction body of claim 1, wherein the surface portion has a kinetic coefficient of friction of between about 0.20 and about 0.90, when a specimen of the friction body comprising at least a part of said surface portion is pressed onto a 45 g/m2 paper made of 100% chemical pulp and having a brightness of about 83% with a load of about 500 g per about 3 mm2 to about 8 mm2 contact area contact area and pulled across the paper with a constant pull rate of about 1.6 mm/s.

13. The friction body of claim 1, wherein at least the surface portion of the friction body has a Shore A hardness of between about 50 to about 90.

14. The friction body of claim 1, wherein at least the surface portion of the friction body has a thermal conductivity of less than 0.05 W/(m·K).

15. The friction body of claim 1, wherein the friction body has a Young's modulus of less than about less than about 35 MPa.

16. The friction body of claim 1, wherein the friction body has a specific heat capacity of at least about 1300 J·kg−1·K−1.

17. A writing instrument comprising a writing tip, a storage compartment comprising a thermochromic ink which is in fluid communication with the writing tip, and a friction body as defined in claim 1; optionally wherein the friction body is positioned at an end of the writing instrument opposite to the writing tip or wherein the writing instrument comprises a cap for capping the writing tip which comprises the friction body.

18. The writing instrument of claim 17, wherein the thermochromic ink is configured to change its color or discolor when heated to a temperature of between about 40° C. to about 80° C.

19. A friction body for discoloring handwriting written with a thermochromic ink with frictional heat, wherein the friction body comprises a first surface portion comprising bark material, and wherein the friction body comprises a second surface portion comprising natural cork.

* * * * *